United States Patent [19]
Budrow et al.

[11] 3,739,387
[45] June 12, 1973

[54] DUAL PURPOSE ANTENNA CONTROL

[75] Inventors: Jack C. Budrow; Glenn A. Reed, both of Battle Creek, Mich.

[73] Assignee: Barker Manufacturing Company, Inc., Battle Creek, Mich.

[22] Filed: July 13, 1971

[21] Appl. No.: 162,241

Related U.S. Application Data

[63] Continuation-in-part of Ser. No. 59,604, July 30, 1970, Pat. No. 3,665,477, which is a continuation-in-part of Ser. No. 789,834, Jan. 8, 1969, Pat. No. 3,587,104.

[52] U.S. Cl. ............... 343/714, 343/881, 343/882
[51] Int. Cl. .............................................. H01q 1/32
[58] Field of Search ................. 343/713, 714, 805, 343/880, 881, 882

[56] References Cited
UNITED STATES PATENTS
3,065,942  11/1962  Cameron ........................... 343/714
3,412,404  11/1968  Bergling ............................ 343/714

*Primary Examiner*—Eli Lieberman
*Attorney*—Townsend F. Beaman and Duncan F. Beaman

[57] ABSTRACT

The invention pertains to an antenna, such as a television antenna, particularly suitable for use with recreational vehicles wherein the signal-receiving components may be elevated to a signal-receiving position, or retracted to a position adjacent the recreational vehicle roof for traveling. The signal-receiving components are mounted upon a linkage which pivots about horizontal axes, and a worm wheel is employed to pivot the linkages about their associated axes. A vertically disposed rotatable shaft mounted upon a rotatable base member includes a worm gear meshing with the linkage worm wheel, and the shaft is rotatable from within the recreational vehicle interior. The shaft is additionally capable of axial movement whereby the shaft may be keyed to the base member wherein rotation of the shaft directly rotates the base member. A crank handle is mounted to the shaft for producing rotation thereof wherein rotation of the crank selectively raises and lowers the signal-receiving components or rotates the base member and signal-receiving components for directional purposes, the dual function being provided by a single crank handle.

8 Claims, 4 Drawing Figures

INVENTORS
JACK C. BUDROW
GLENN A. REED

Patented June 12, 1973
3,739,387
2 Sheets-Sheet 2
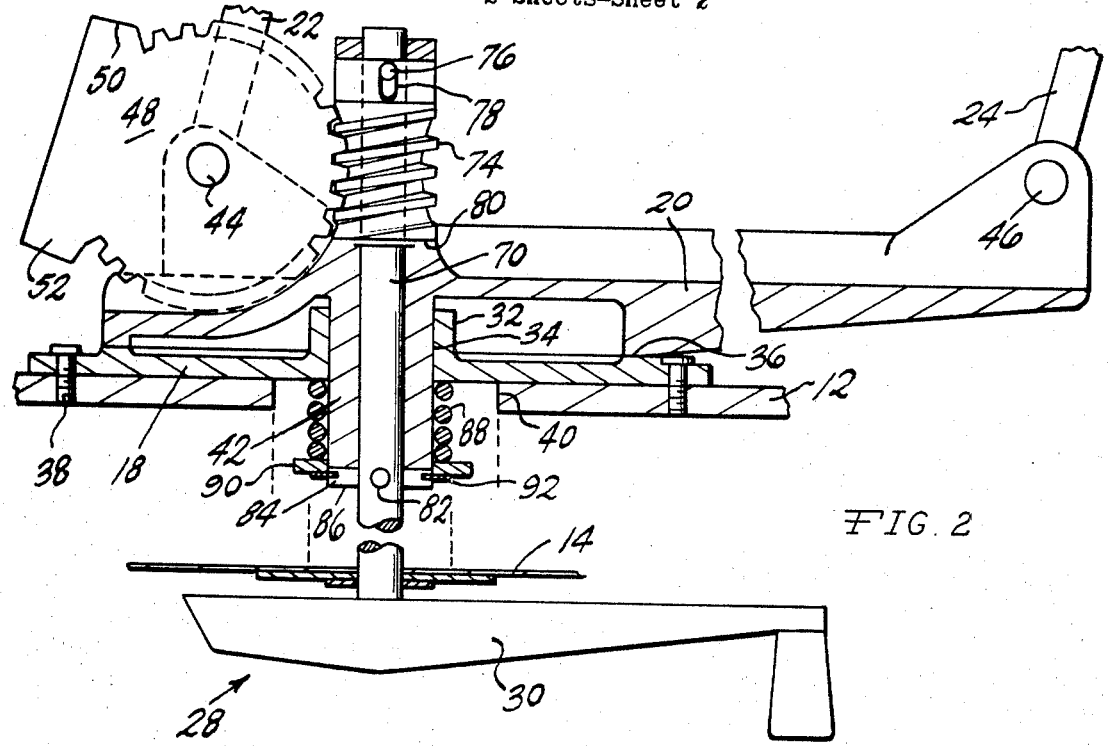
FIG. 2
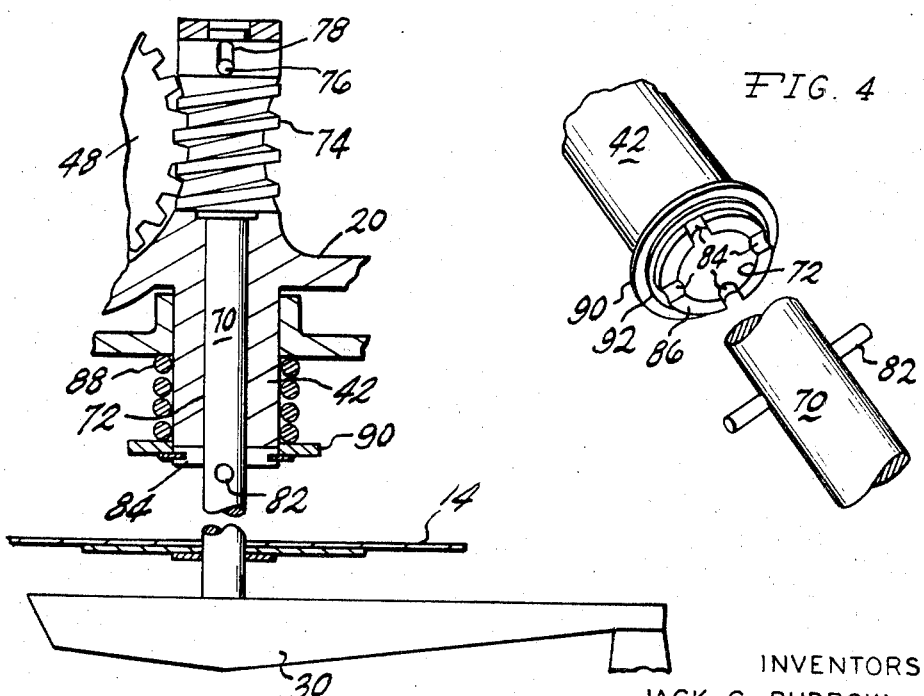
FIG. 3
FIG. 4
INVENTORS
JACK C. BUDROW
GLENN A. REED
BY Beaman & Beaman
ATTORNEYS

DUAL PURPOSE ANTENNA CONTROL

CROSS-REFERENCES TO RELATED APPLICATIONS

The instant application is a continuation-in-part of our application Ser. No. 59,604, filed July 30, 1970, now U.S. Pat. No. 3,665,477, which is a continuation-in-part of Ser. No. 789,834, filed Jan. 8, 1969, now U.S. Pat. No. 3,587,104.

BACKGROUND OF THE INVENTION

The invention pertains to elevatable and retractable antennas, and particularly relates to relatively small antennas of the television type suitable for mounting upon the roof of recreational vehicles, such as trailers and campers.

Television antennas capable of being retracted and maintained adjacent the roof of recreational vehicles for travel purposes and elevated to an optimum signal-receiving position during use are well suited for recreational vehicle purposes. For purposes of convenience it is desirable to mount the controls for the antenna, which produce elevational and directional rotation, within the recreational vehicle, usually adjacent the vehicle ceiling, and in the past such controls have usually consisted of two separate elements. One control member is for the purpose of elevating and retracting the antenna structure, while the other member is for the purpose of rotating the support for the antenna wherein the antenna may be pointed toward the source of the television signal for optimum reception. This type of conventional control is disclosed in applicants' application Ser. No. 789,834.

As recreational vehicles are occupied by persons of all ages and ordinary skills, it is desirable that the operation and control of an elevatable and retractable antenna be as simple as possible and the fewer the controls necessary to achieve the desired function the better. Also, in an item of this type which is produced in quantities for the consumer market, a dependable and rugged construction which is inexpensive to manufacture and purchase is of prime importance. The present invention meets these requisites and simplifies the control and operation of the aforedescribed antenna as compared with devices of this type presently available.

SUMMARY OF THE INVENTION

It is an object of the invention to provide an elevatable and retractable antenna of an economical and dependable construction which is easily operated, a single control member functioning in a dual purpose for producing elevation and retraction of the signal-receiving elements and also providing directional adjustment.

In the practice of the invention a base member is rotatably mounted upon a support, the support usually being horizontally disposed, such as the roof of a recreational vehicle. Linkages are mounted upon the base member for movement about substantially horizontal axes and signal receiving elements, such as dipoles, are mounted upon the linkages wherein the linkages may be moved between an elevated position, so that the signal-receiving elements are disposed above the recreational vehicle roof a maximum extent, and a retracted position wherein the signal-receiving elements are disposed adjacent the roof for travel purposes. The signal receiving elements may include dipoles which pivot between open and closed positions in accord with the position of the linkages.

The base member is mounted for rotation about a substantially vertical axis and a shaft coincident with the base member axis is rotatably mounted on the base member having a worm gear fixed thereto which meshes with a worm wheel attached to the signal-receiving element-supporting linkages. The lower end of the shaft extends into the recreational vehicle interior and is provided with a manually operated crank. Thus, upon rotation of the crank to rotate the shaft and worm, the linkages may be pivoted between elevated and retracted positions.

Additionally, the shaft is capable of axial movement within the base member and detent means carried by the shaft selectively cooperate with detent-receiving means on the base member so that upon engagement of the detent and detent-receiving means, as controlled by the axial position of the shaft, the control crank may be used to rotate the base member for directional purposes. Thus, depending on the axial position of the shaft within the base member, the crank may be selectively used for elevating and retracting the signal-receiving elements or rotating the base member for varying the directional orientation of the base member and signal-receiving member elements.

The utilization of structure in accord with the invention simplifies manufacture and installation as well as simplifies operation wherein persons of ordinary skill may readily operate the antenna without previous instruction.

BRIEF DESCRIPTION OF THE DRAWINGS.

The aforementioned objects and advantages of the invention will be appreciated from the following description and accompanying drawings wherein:

FIG. 2 is an elevational sectional view as taken through the base member illustrating the elevated position and illustrating the control member components and detent in a base member engaging position for producing rotation of the base member and signal-receiving elements, FIG. 3 is an elevational, sectional, detail view of the control shaft, worm gear and crank handle illustrating the relationship of components during elevation and retraction of the linkages, and FIG. 4 is an enlarged, detail, perspective view of the shaft and detent structure.

Figure 1:
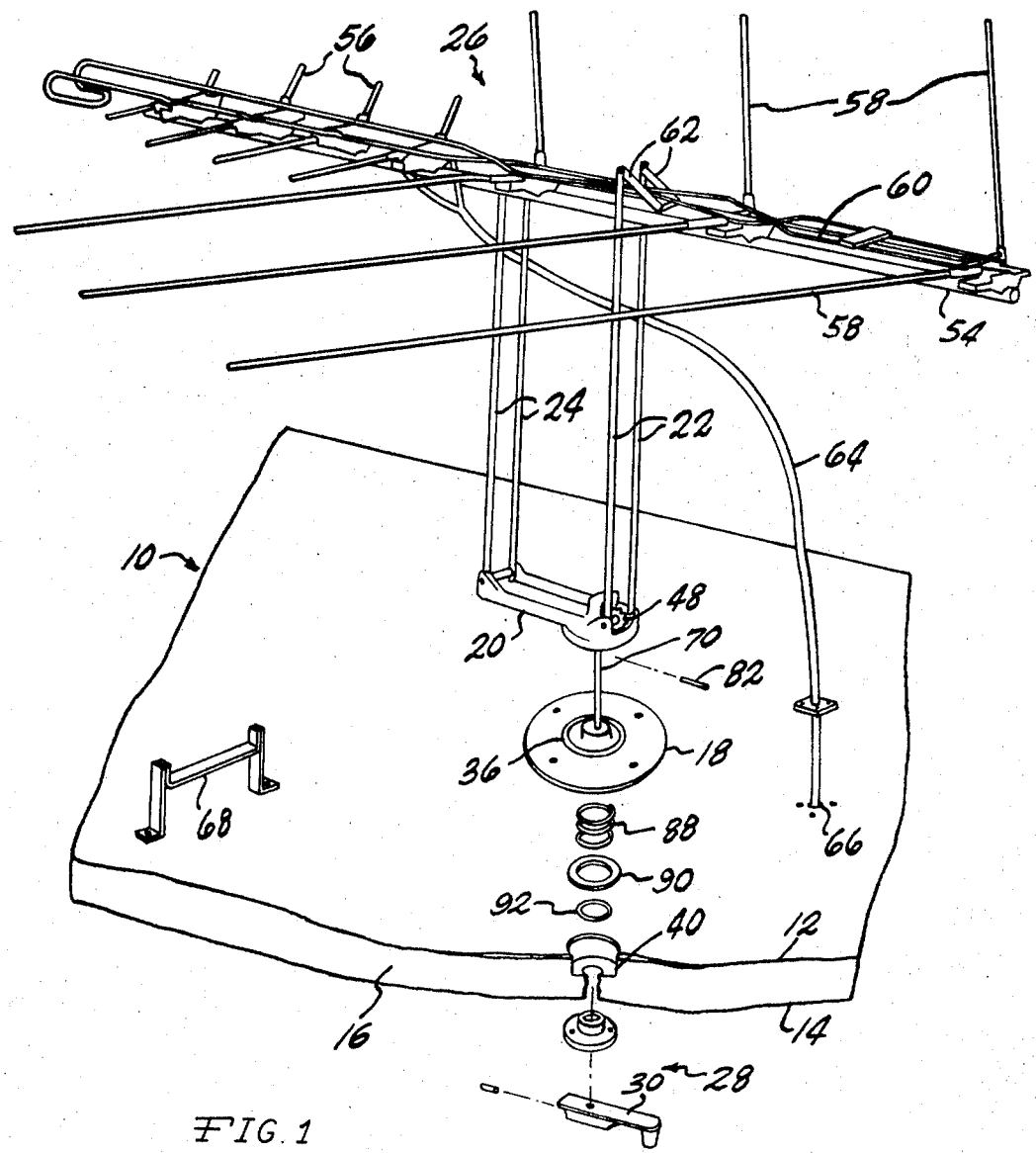
FIG. 1 is an exploded, perspective, partially sectioned view of an antenna in accord with the invention.

DESCRIPTION OF THE PREFERRED EMBODIMENT.

With reference to FIG. 1, a roof support for the antenna is illustrated at 10, which constitutes the roof of a recreational vehicle such as a travel trailer, camper, or the like, and includes an exterior surface 12 and an interior surface 14 defining the vehicle ceiling. Insulation 16 is located between the surfaces 12 and 14.

The illustrated construction basically includes a bearing plate 18 fixed to the roof exterior surface 12. A base member 20 is rotatably supported on bearing plate 18 and linkages 22 and 24 are mounted upon the base member and support the signal-receiving elements 26 of the antenna. Control means, generally indicated at 28, is upon the base member and includes a crank handle 30 located within the vehicle interior adjacent the vehicle ceiling surface 14.

The bearing plate 18 is of a circular configuration including a central boss 32 having a bore 34 defined therein and a flat annular bearing surface 36 is concentrically related to the bore. The bearing plate is attached to the roof 10 by fasteners 38, FIG. 2, wherein the boss 32 is substantially concentrically located with respect to an opening 40 cut into the roof in order to permit installation of the antenna, as will be appreciated from FIG. 1.

The base member 20 is rotatably mounted upon the bearing plate 18 and is of a configuration apparent in FIGS. 1 and 2, and includes a downwardly extending hub 42 rotatably received within the base plate bore 34. The base member includes upstanding lugs which are bored to receive horizontally disposed shafts 44 and 46 which serve as the means for pivotally connecting linkages 22 and 24, respectively, to the base member. Each linkage set consists of two rod elements whereby the linkages 22 and 24 may be pivoted from a retracted position, wherein the linkage elements are substantially horizontal, to the elevated position, as shown in FIGS. 1 and 2. A worm wheel 48 is fixed to the pivot shaft 44 intermediate the links of set 22 whereby rotation of the worm wheel will pivot linkages 22 and thereby produce elevation and retraction of both linkage sets. Preferably, the worm wheel 48 includes stop portions 50 and 52 defined thereon which determine the limit of pivoting of the linkages.

The signal-receiving elements, generally indicated at 26, are mounted upon the linkages 22 and 24 at the outer ends thereof. The signal-receiving elements constitute no part of the present invention and the construction of the signal-receiving elements is identical to that of Ser. No. 59,604. Basically, signal-receiving elements include support member 54 adapted to be horizontally disposed and pivotally connected to the upper ends of the linkages. The support member 54 fixedly supports small dipoles 56 and the larger dipoles 58 are pivotally mounted upon support 54 about vertical axes and are capable of being moved horizontally from an extended or open position shown in FIG. 1, to a closed position wherein the dipoles 58 are substantially parallel to the support member 54. Opening and closing of the dipoles 58 is achieved through a control rod 60 axially movable in a direction parallel to the support member 54 as controlled by linkages 62 connected to the upper end of the linkages 22. Thus, as the linkages 22 and 24 are pivoted between the retracted and elevated positions, the dipoles 58 pivot between closed and open positions, respectively. The antenna lead wire 64 is attached to the signal-receiving elements and extends through the vehicle roof 10 through an opening 66.

When the antenna is in the retracted position, the support member 54 may rest upon the bracket 68 attached to upper surface of the vehicle roof.

Control of the signal-receiving elements 26 is achieved through the control member 28 which includes a shaft 70 rotatably mounted within the base member hub 42 in bore 72 and concentric to the axis of rotation thereof. The shaft 70 has a worm gear 74 keyed thereto which meshes with the worm wheel 48. Keying of the worm 74 to the shaft 70 is produced by a pin 76 diametrically extending through the shaft 70 and received within the vertically elongated slot 78 defined in the worm. The worm bears against a flat bearing surface 80 defined on the base member 20.

At the lower end of the shaft 70 the crank handle 30 is fixed for producing rotation thereof and rotation of the worm 74. The shaft 70 is also capable of axial movement within the base member bore 72 as limited by the movement of the pin 76 within the slot 78.

In order to produce the rotation of the base member 20, the shaft 70 is provided with the diametrically extending pin 82 which extends beyond the diameter of the shaft, FIG. 4, and the pin 82 functions as a detent capable of being selectively received within detent recesses 84 defined in the lower end 86 of the base member hub 42, FIG. 4. When the shaft 70 is moved upwardly to the position shown in FIG. 2, the detent pin 82 is received within diametrically aligned recesses 84 for keying the shaft 70 to the base member hub, FIG. 2. When the shaft 70 is pulled downwardly to the position shown in FIG. 3, the pin 82 is withdrawn from the recesses 84 and rotation of the shaft 70, thereupon, rotates the worm 74 relative to the base member 20 to rotate worm wheel 48 and raise or lower linkages 22 and 24 and the signal-receiving elements 26.

In order to produce sufficient frictional engagement between the base member 20 and the bearing plate 18 to withstand the effects of wind on the signal-receiving elements which might tend to rotate the base member, an increased frictional resistance between the base member and bearing surface 36 is achieved by the use of a spring 88 interposed between the underside of the bearing plate 18 and base member 20 by imposing downward force upon the base member hub due to the engagement of the spring 88 with the washer 90 circumscribing the hub. The washer 90 is maintained in position by a snap ring 92 received within a groove defined adjacent the lower end of the hub, From the foregoing description it will be appreciated that the described relationship of components permits crank handle 30 to serve in the dual capacity of either elevating and retracting the signal-receiving elements 26, or rotating the base member 20 so as to orient the signal-receiving elements in that direction for receiving a maximum strength signal. By merely shifting the shaft 70 upwardly to the position shown in FIG. 2, the crank 30 serves to rotate the base member and the components mounted thereon, including the signal-receiving elements 26. Shifting the shaft 70 to its downwardly position shown in FIG. 3, which is easily accomplished by pulling down on the crank handle, disengages the detent pin 82 from the recesses 84 to permit the shaft 70 to rotate within the bore 72 and rotate the worm wheel 48 and linkages 22 and 24 for elevation and retraction of the signal-receiving elements 26. The illustrated invention significantly simplifies the structure necessary to produce these two operations of antenna control without sacrificing strength and desirable physical characteristics. Installation of the apparatus is simplified in that hole 40 may be readily formed in a vehicle roof and the presence of the crank handle 30 within the vehicle interior does not significantly detract from the vehicle interior appearance, nor present an obstacle likely to be accidentally encountered by an occupant's head.

It is appreciated that various modifications to the inventive concept within the scope of the invention may be apparent to those skilled in the art.

We claim:

1. An elevatable and retractable antenna comprising, in combination, a base member rotatably mounted for rotation about a substantially vertical first axis, linkage means pivotally mounted on said base member for rotation about a substantially horizontal second axis between elevated and retracted positions, antenna signal-receiving means mounted upon said linkage means for movement therewith to said elevated and retracted positions, a control member mounted on said base member to rotate around said vertical axis, transmission means operatively connecting said control member to said linkage means whereby rotation of said control member relative to said base member pivots said linkage means about said second axis, first key means mounted on said control member, second key means defined on said base member adapted to selectively cooperate with said first key means to lock said control member to said base member whereby said control member selectively rotates said base member about said first axis, said control member being vertically movably mounted upon said base member between first and second positions relative to said base member engaging and disengaging said key means, respectively.

2. In an elevatable and retractable antenna as in claim 1 wherein said transmission includes a worm wheel connected to said linkage means rotatable about said second axis, and a worm gear mounted on said control member for rotation therewith meshing with said worm wheel.

3. In an elevatable and retractable antenna as in claim 2 wherein said control member includes a shaft rotatably mounted on said base member coaxial with said first axis and a crank handle attached to said shaft.

4. In an elevatable and retractable antenna as in claim 1 wherein said control member includes a shaft rotatably mounted on said base member coaxial with said first axis and axially movable with respect to said base member between said first and second positions, said first key means being mounted on said shaft, a hub defined on said base member receiving and encircling said shaft and including an end surface, said second key means being defined on said hub.

5. In an elevatable and retractable antenna as in claim 4 wherein said first key means comprises a pin diametrically extending through said shaft and radially extending beyond the shaft outer diameter, and said second key means comprises a radially extending recess defined in said hub end surface.

6. In an elevatable and retractable antenna as in claim 3 wherein said shaft includes an upper end and a lower end, said transmission including a worm wheel connected to said linkage means rotatable about said second axis and a worm fixed to said shaft upper end meshing with said worm wheel, and a crank handle attached to said shaft lower end for rotating said shaft about said first axis.

7. An elevatable and retractable antenna adapted to be mounted on a substantially horizontal support member having an upper surface and a lower surface comprising, in combination, a base member rotatably mounted upon the support member upper surface for rotation about a substantially vertical first axis, antenna signal-receiving means, movable elevatable and retractable means mounting said signal-receiving means upon said base member for selective movement of said signal-receiving means between elevated and retracted positions, a single control member comprising a shaft rotatably and axially shiftably mounted on said base member for rotation about said first axis and linear movement parallel to said axis and extending through the support member manually operable from below the lower surface, and selectively operable first and second drive means interposed between said control member and said elevatable and retractable means, and said control member and base member, respectively, for permitting said control member to selectively operate said elevatable and retractable means or rotate said base member about said first axis.

8. In an elevatable and retractable antenna as in claim 7 wherein said elevatable and retractable means includes a worm wheel mounted on said base member for rotation about a substantially horizontal second axis and said first drive means includes a worm gear mounted on said shaft meshing with said worm wheel, and said second drive means includes a detent mounted upon said shaft cooperable with a recess defined on said base member upon axial shifting of said shaft toward said base member.

* * * * *